(12) United States Patent
Wang et al.

(10) Patent No.: US 12,346,084 B2
(45) Date of Patent: Jul. 1, 2025

(54) MASTER PATTERN GENERATION METHOD BASED ON CONTROL PROGRAM ANALYSIS AND TRAINING METHOD FOR CYCLE ANALYSIS MODEL

(71) Applicant: UDMTEK, Suwon-Si (KR)

(72) Inventors: Gi Nam Wang, Yongin-Si (KR); Jun Pyo Park, Suwon-Si (KR); Yeon Dong Kim, Hwaseong-Si (KR); Nam Ki Kim, Suwon-Si (KR); Hee Chan Yang, Suwon-Si (KR); Yoon Woo Ha, Suwon-Si (KR); Seung Jong Jin, Suwon-Si (KR)

(73) Assignee: UDMTEK, Suwon-Si (KR)

( * ) Notice: Subject to any disclaimer, the term of this patent is extended or adjusted under 35 U.S.C. 154(b) by 487 days.

(21) Appl. No.: 17/658,553

(22) Filed: Apr. 8, 2022

(65) Prior Publication Data

US 2022/0342375 A1    Oct. 27, 2022

(30) Foreign Application Priority Data

Apr. 9, 2021   (KR) .................. 10-2021-0046618

(51) Int. Cl.
*G05B 19/05*    (2006.01)
(52) U.S. Cl.
CPC .. *G05B 19/056* (2013.01); *G05B 2219/13076* (2013.01)
(58) Field of Classification Search
CPC ........ G05B 19/056; G05B 2219/13076; G05B 2219/13018; G05B 2219/13048;
(Continued)

(56) References Cited

U.S. PATENT DOCUMENTS

| 2021/0096827 A1* | 4/2021 | Stump ................ G05B 19/4188 |
| 2022/0066409 A1* | 3/2022 | Soler Garrido ...... G05B 19/056 |
| 2022/0342377 A1* | 10/2022 | Wang .................... G06N 3/045 |

FOREIGN PATENT DOCUMENTS

| KR | 101527419 B1 | 6/2015 |
| KR | 101566355 B1 | 11/2015 |

(Continued)

OTHER PUBLICATIONS

Nam Wang, "Master Pattern Generation Method and Apparatus for Checking Normal Operation of PLC Based Manufacturing System" (machine translation of KR101566355B1), Nov. 6, 2015, espacenet machine translation (Year: 2015).*

(Continued)

*Primary Examiner* — Christopher W Carter
(74) *Attorney, Agent, or Firm* — Osha Bergman Watanabe & Burton LLP

(57) ABSTRACT

The present disclosure discloses a master pattern generation method which is a major pattern in a repeated cycle by analyzing programmable logic controller (PLC) logic, and a method for training a model that may analyze an error of a cycle using the generated master pattern.

The master pattern generation method and the training method for a cycle analysis model according to the present disclosure are different from the related art in that the methods are a technology of processing a machine control language (low-level language) that is difficult for humans to analyze and converting the machine control language into an analyzable language (high-level language), i.e., a machine language processing (MLP)-based technology that analyzes the executed machine language (a language that controls a machine) with a computer and can be understood by humans.

13 Claims, 18 Drawing Sheets

(58) Field of Classification Search
CPC .... G05B 19/058; G05B 23/024; G05B 19/4184;
G05B 23/0243
See application file for complete search history.

(56) References Cited

FOREIGN PATENT DOCUMENTS

| | | | |
|---|---|---|---|
| KR | 102165207 | B1 | 10/2020 |
| KR | 102220139 | B1 | 2/2021 |

OTHER PUBLICATIONS

Office Action issued in corresponding KR Application No. 10-2021-0046618 dated Aug. 3, 2022 (7 pages).

* cited by examiner

MASTER PATTERN GENERATION METHOD BASED ON CONTROL PROGRAM ANALYSIS AND TRAINING METHOD FOR CYCLE ANALYSIS MODEL

CROSS-REFERENCE TO RELATED APPLICATION

This application claims priority to and the benefit of Korean Patent Application No. 10-2021-0046618, filed on Apr. 9, 2021, the disclosure of which is incorporated herein by reference in its entirety.

BACKGROUND

1. Field of the Invention

The present disclosure relates to a master pattern generation method, and more particularly, to a method for finding a main pattern in a repeated cycle by analyzing programmable logic controller (PLC) logic.

2. Discussion of Related Art

The content described in this section merely provides background information for embodiments disclosed in the present specification, and does not constitute the related art.

Programmable logic controllers (PLCs) are mainly used to build automation lines, and are driven by the specification (PLC control logic code) of PLC control logic written through operation symbols such as AND/OR and relatively simple functions such as TIMER/FUNCTION BLOCK. The control logic is defined using a memory address of PLC hardware. In this case, a memory address of PLC hardware is called a contact. The automation lines are operated by defining an input/output relationship with these contacts and controlling values of contacts for each situation.

In general, the PLC control logic has numerous contacts depending on a scale of the automation lines. Accordingly, attempts are being made to detect anomalies in automation lines by analyzing the content of the PLC control logic code between the contacts to analyze the relationship and sequence between the contacts to generate a reference master pattern for determining whether the automation lines are in a normal operating state.

However, the state of the automation lines operated by the PLC changes over time for various causes, such as equipment aging, replacement, and changes in the PLC control code, and the reference master pattern for determining the normal operating state will also change. Accordingly, the previously generated reference master pattern is inappropriate to use as basic data for determining whether the automation lines in the changed environment are in a normal operating state.

In addition, in the recent automated manufacturing industry, as the complexity of the manufacturing lines increases, the control logic has become vast and has been designed to be very complex. Accordingly, logic of PLC programs has also become more complicated. For this reason, it is also becoming more and more difficult to diagnose and monitor PLC programs, and accordingly, the time it takes to find and correct an error is gradually increasing.

RELATED ART DOCUMENT

Patent Document (Patent Document 1) Korean Patent No. 10-1527419

SUMMARY OF THE INVENTION

The present disclosure is directed to providing a master pattern generation method for detecting a process abnormality by converting a machine control language into a language level that people can understand and analyze, and a training method for a cycle analysis model using the same.

The present disclosure is not limited to the above-described effects, and other objects that are not described may be obviously understood by those skilled in the art from the following description.

According to an aspect of the present disclosure, there is provided a master pattern generation method from ladder logic of a programmable logic controller (PLC), the method including: generating, by a processor, a relationship between contacts included in the ladder logic; generating bars for each cycle from log data and generating links for each cycle; calculating a statistic of the bars and links included in a plurality of cycles; and generating a master pattern based on the calculated statistic.

The generating of the relationship between the contacts may include removing a manual column from the ladder logic and expanding a path by allowing contact A to search for a step in which an output contact is used.

The relationship between the contacts may be Include, Includable, Exclude, and Excludable. In this case, in the generating of the relationship between the contacts, when two different contacts each have the same contact as Include and Exclude, the relationship between the two different contacts may be generated as Exclude.

The relationship between the contacts may be Include, Includable, Exclude, and Excludable, in the generating of the link, when the relationship between the two contacts may be Include or Includable, a link connecting starting points of each bar corresponding to the two contacts is generated, and when the relationship between the two contacts is Exclude or Excludable, a link connecting an ending point of a FROM bar and a starting point of the TO bar among the two contacts may be generated.

The generating of the link may include removing a bar or a link whose frequency of occurrence within each cycle is less than a preset minimum occurrence rate.

The generating of the link may include removing a link whose duration is outside of a preset duration range.

The statistic of the bar may be an average start time of the bars, an average duration of the bars, and a standard deviation of durations of the bars, and the statistic of the links may be an average duration of the links and a standard deviation of durations of the links.

The calculating of the statistic may include calculating the statistic of the bar and the statistic of the link included in the plurality of cycles corresponding to conditions established by a user.

The master pattern generation method may further include: after the generating of the master pattern, extracting common elements of the master pattern for each condition and forming a tree of the extracted common elements.

According to another aspect of the present disclosure, there is provided a training method for a cycle analysis model of a PLC using a master pattern, the method including: generating, by a processor, input data for start times of all bars, durations of all the bars, and durations of all the bars included in each cycle by using log data of a PLC; comparing the input data with the master pattern generated according the master pattern generation method according to the present disclosure to generate output data for whether there are errors for each bar and link; and training an artificial neural network with a supervised learning algorithm using the input data and the output data.

The start time of each bar in the input data may be a positive value for a relative time interval between a start time of each cycle and the start time of each bar.

A start time for a bar that does not occur in the input data may be a negative value.

The output data may have a first value when a contact or a link of each cycle is normal compared to the master pattern, and have a second value when the contact or link of each cycle is abnormal compared to the master pattern.

The master pattern generation method and/or the training method for a cycle analysis model according to the present disclosure may be implemented in the form of a computer program written to allow a computer to perform each operation of the master pattern generation method and/or the training method for a cycle analysis model and recorded in a computer-readable recording medium.

Other specific details of the present disclosure are included in the detailed description and accompanying drawings.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
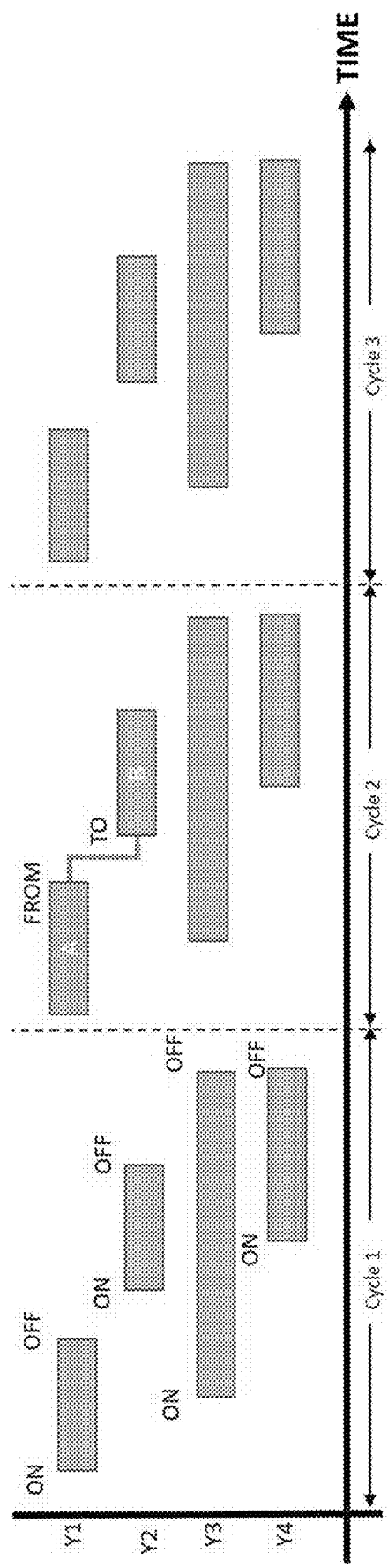
FIG. 1 is a reference diagram of a Gantt chart visualizing a master pattern and a cycle.

Various advantages and features of the present disclosure and methods accomplishing them will become apparent from the following description of embodiments with reference to the accompanying drawings. However, the present disclosure is not limited to the embodiments disclosed herein, but will be implemented in various forms. The embodiments make contents of the present disclosure thorough and are provided so that those skilled in the art to which the present disclosure pertains (hereinafter, "those skilled in the art") can easily understand the scope of the present disclosure. Therefore, the present disclosure will be defined by the scope of the appended claims.

The terminology used in the present disclosure is for the purpose of describing embodiments and is not intended to limit the scope of the present disclosure. In the present disclosure, the singular also includes the plural unless the phrase specifically states otherwise. Throughout this specification, the term "comprise" and/or "comprising" will be understood to imply the inclusion of stated constituents but not the exclusion of any other constituents.

Like reference numerals refer to like components throughout the specification and "and/or" includes each of the components described and includes all combinations thereof. Although "first," "second," and the like are used to describe various components, it goes without saying that these components are not limited by these terms. These terms are used only to distinguish one component from other components. Therefore, it goes without saying that a first component described below may be a second component within the technical scope of the present disclosure.

Unless otherwise defined, all terms (including technical and scientific terms) used in the present disclosure may be used with meanings commonly understood by those skilled in the art to which the present disclosure pertains. In addition, terms defined in commonly used dictionary are not ideally or excessively interpreted unless explicitly defined otherwise. Hereinafter, embodiments of the present disclosure will be described in detail with reference to the accompanying drawings.

Definitions of terms used in the present disclosure are as follows.

A master pattern is a normal standard of a cycle that digitizes an ON signal duration and an interval (link) of a contact signal using log data of a programmable logic controller (PLC) contact of the cycle. The master pattern is to determine whether the cycle is normal or abnormal by comparing with the PLC contact in the cycle.

A PLC is a control device with high autonomy that enables program control by adding a numerical calculation function to a basic sequence control (replacement of functions, such as a relay, a timer, and a counter, with semiconductor devices such as an integrated circuit (IC) and a transistor) function. For reference, in the US Electrical Industrial Standards, a PLC is defined as "an electronic device of digital operation which is used for a programmable memory to perform special functions, such as logic, a sequence, a timer, a counter, and a calculation, through a digital or analog input/output module and controls various types of machines or processors."

The log data is a result obtained by collecting PLC contact data at regular intervals. The log data is data expressed as [contact, value, time] and is value data of a specific contact at a corresponding time.

A cycle is a section in which the contact data is constantly repeated. A unit of the cycle may be diverse, such as a plant, a line, a process, etc.

FIG. 1 is a reference diagram of a Gantt chart visualizing a master pattern and a cycle.

Referring to FIG. 1, a horizontal axis corresponds to time, and a vertical axis corresponds to a contact. It is illustrated that any Y1, Y2, Y3, and Y4 contacts exist in the Gantt chart illustrated in FIG. 1. Each bar illustrated in FIG. 1 means an "ON" state of a contact. A starting point of each bar is an "ON" time point, and an ending point of each bar is an "OFF" time point. When there is a relationship between contacts, a link connecting the contacts may be generated. A point that is temporally earlier than both ends of the link is called a "FROM," and a point that is temporally later than both ends of the link is called a "TO" point. A bar connected to a FROM point between the contacts connected by the link is called a "FROM bar," and a bar connected to a TO point is called a "TO bar."

Figure 2:
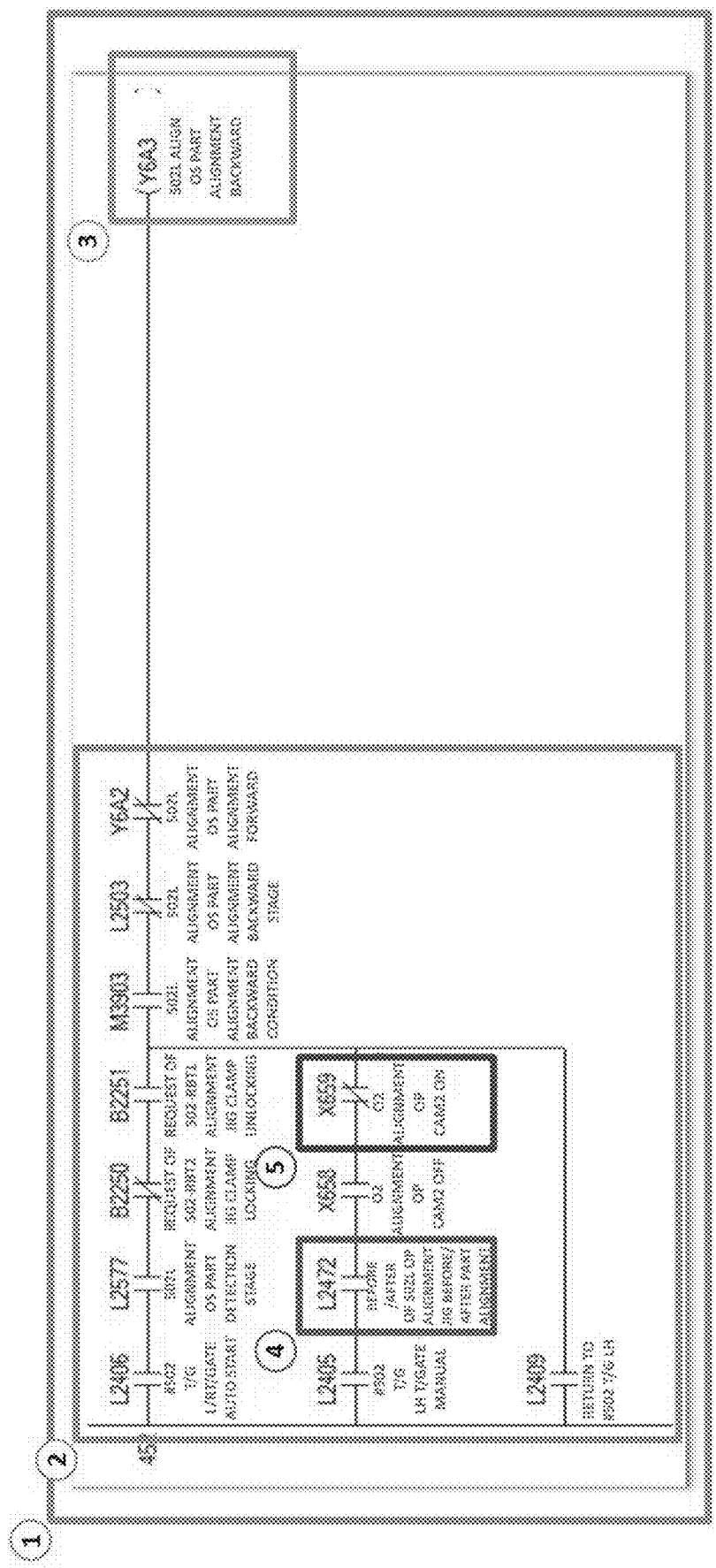
FIG. 2 is a reference diagram for describing a term of a programmable logic controller (PLC) ladder.

FIG. 2 is a reference diagram for describing a term of a PLC ladder.

A control program used in the PLC is ladder logic, and is a main language method for the PLC. Referring to FIG. 2, it can be seen that a plurality of contacts, such as L2406, L2577, L2405, L2409, and Y6A3, are connected by paths in the ladder logic shown as an example. Input contacts (②) for the output contact (③) to be "ON" form a set under specific conditions. A logical operation formula for this output contact to be "ON" is called step (①). The contact that maintains the "OFF" state as usual and then changes to the "ON" state is called "contact A(④)," and the contact that maintains the "ON" state as usual and then changes to the "OFF" state is called "Bcontact (⑤)." An "AND" condition is displayed on one path, and an "OR" condition is displayed on a different path. In the example illustrated in FIG. 2, there are three paths. A "(1) L2406 & L2577 & !B2250 & B2251 & M3903 & !L2503 & !Y6A2" path, a "(2) L2405 & L2472 & X658 & !X659 & M3903 & !L2503 & !Y6A2" path, and a "(3) L2409 & M3903 & !L2503 & !Y6A2" path.

Hereinafter, a master pattern generation method according to the present disclosure will be described. Meanwhile, each operation of the master pattern generation method according to the present disclosure to be described below may be performed by a processor.

Figure 3:
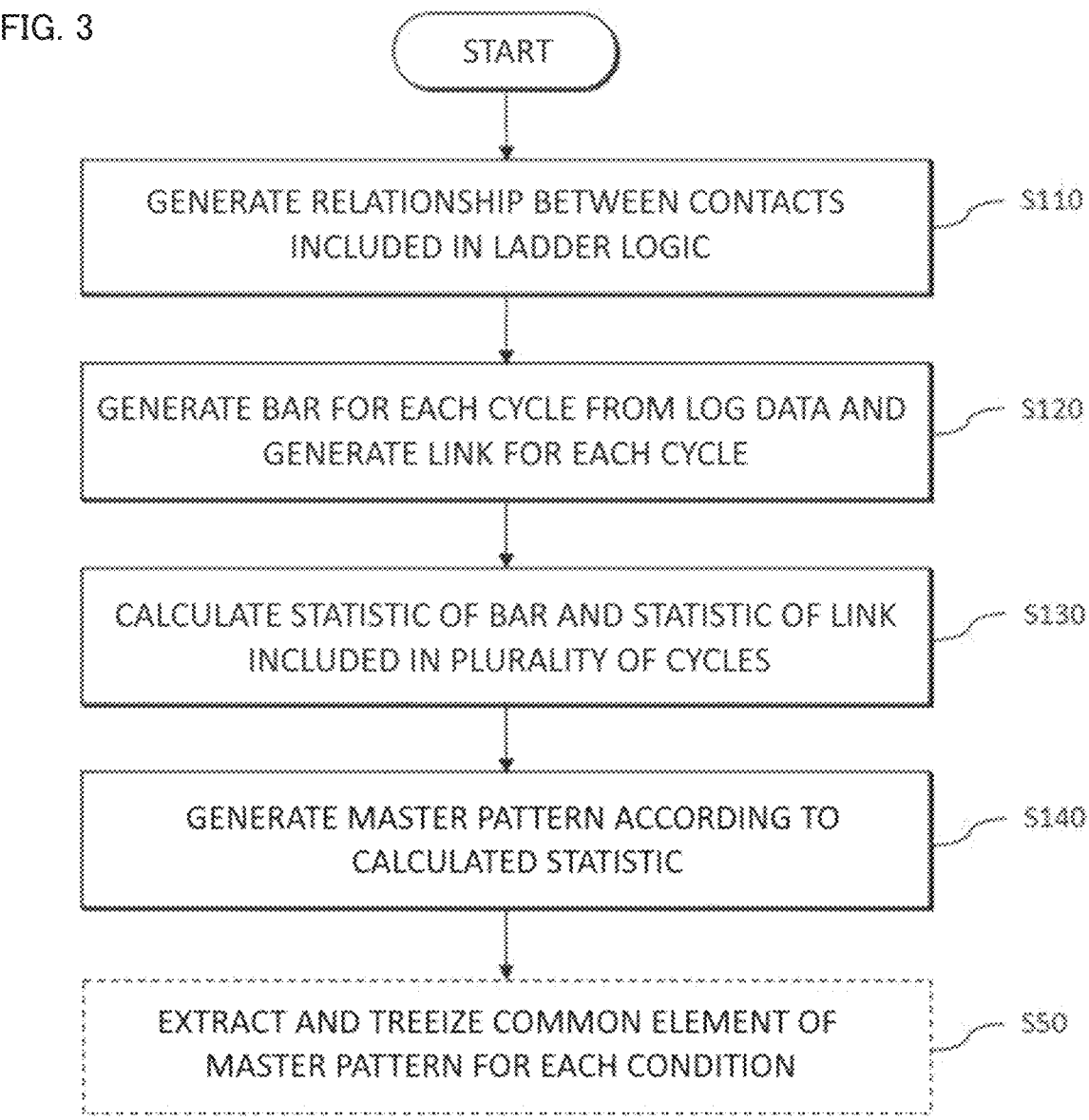
FIG. 3 is a flowchart schematically illustrating a master pattern generation method according to the present disclosure.

FIG. 3 is a flowchart schematically illustrating the master pattern generation method according to the present disclosure.

Referring to FIG. 3, first, operation S10 is an operation of generating a relationship between contacts and may generate a relationship between contacts included in ladder logic. The ladder logic is data stored in the PLC, and the processor may fetch and read data for the ladder logic stored in a memory device.

Figure 4:
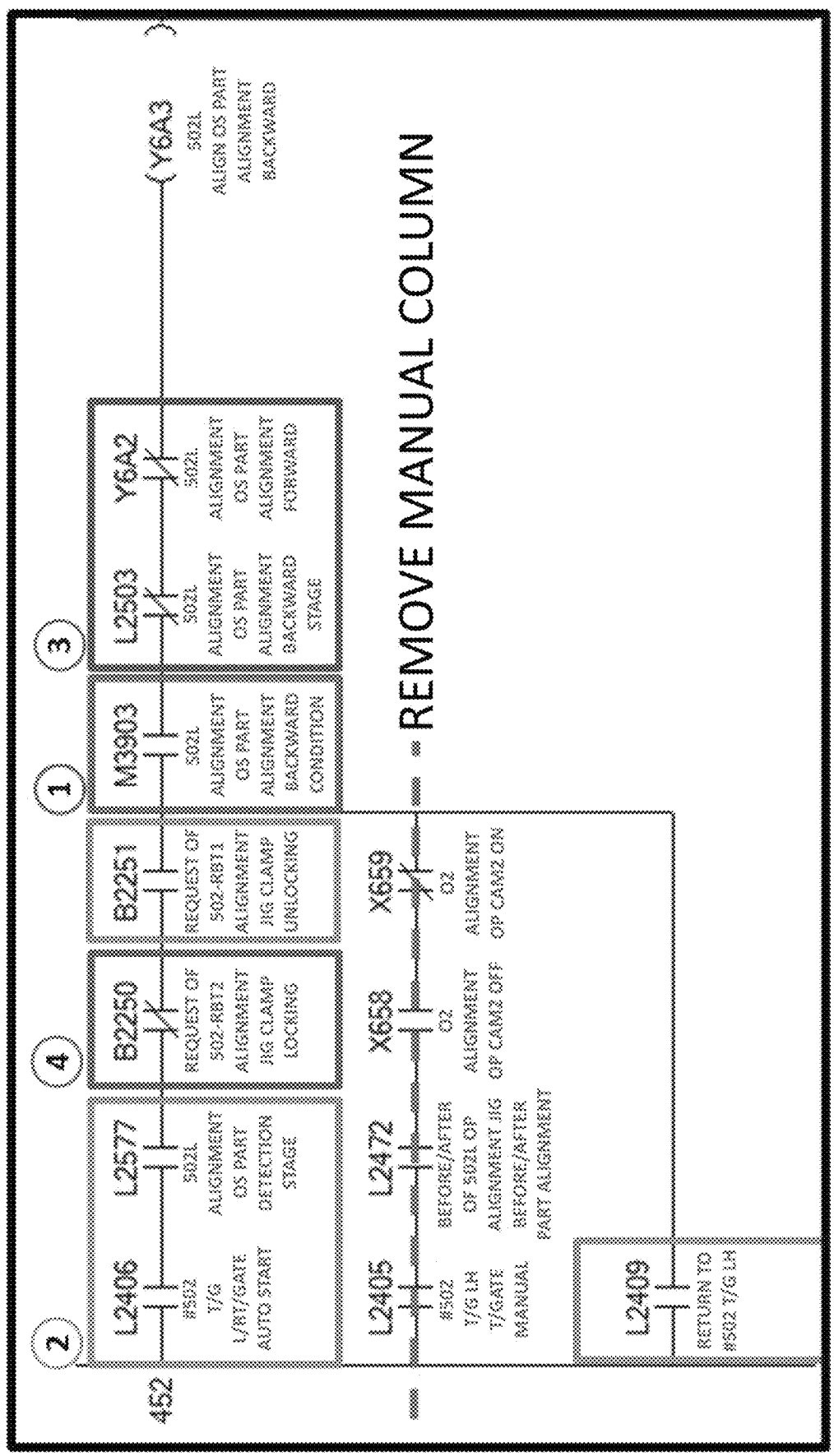
FIGS. 4 and 5 are reference diagrams for generating a relationship between contacts included in ladder logic.
Figure 5:
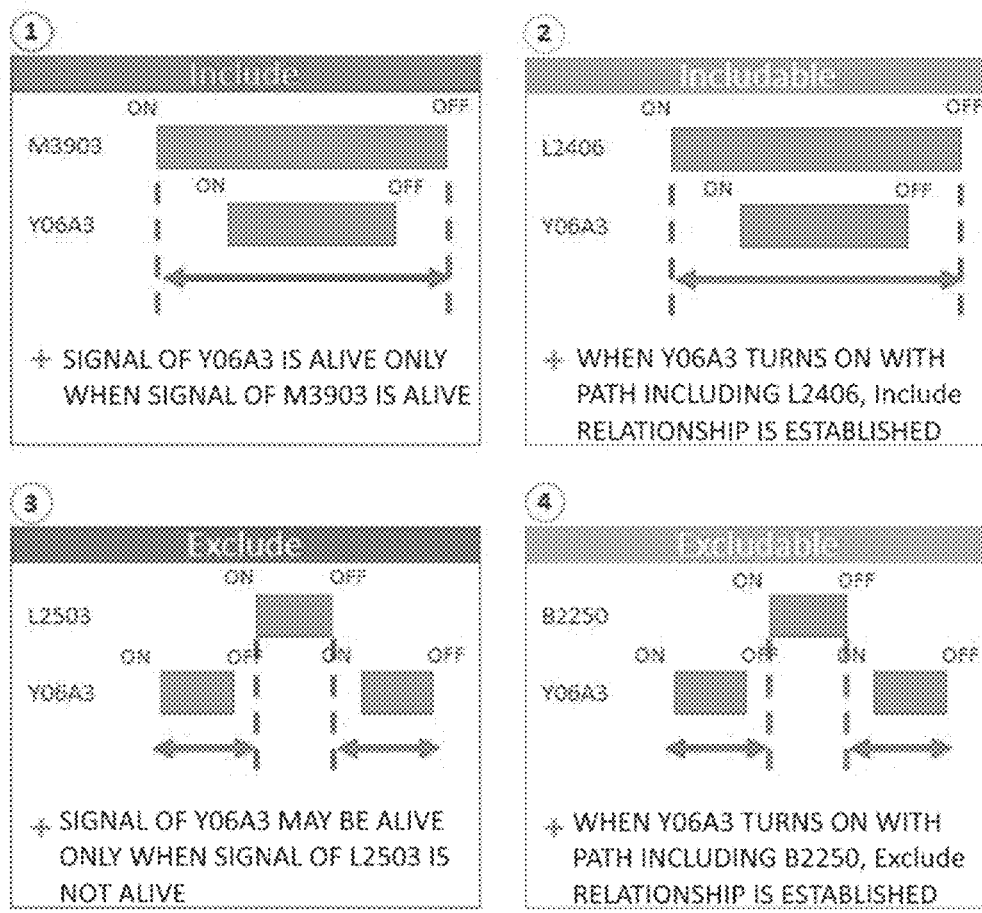

FIGS. 4 and 5 are reference diagrams for generating the relationship between the contacts included in the ladder logic.

Referring to FIGS. 4 and 5, one step presented as an example may be identified. Prior to generating the relationships between the contacts, a manual column may be removed as an unnecessary path to an automated process.

The relationship between the contacts included in the step may be "Include," "Includable," "Exclude," and "Excludable." "Include" is a tag used as contact A in all paths of the tag. "Includable" is a tag that has been used at least once as the contact A in the path of the tag. "Exclude" is a tag used as contact B in all paths of the tag. "Excludable" is a tag that has been used at least once as the contact B in the path of the tag. The tag is any contact for generating the relationship between the contacts.

Meanwhile, the contact A included in any one step may be used as an output contact in another step. In this case, it is necessary to expand not only to a path to identify the relationship between the contacts and to a path within the step, but also to a step in which the corresponding contact is used as the output contact.

Figure 6:
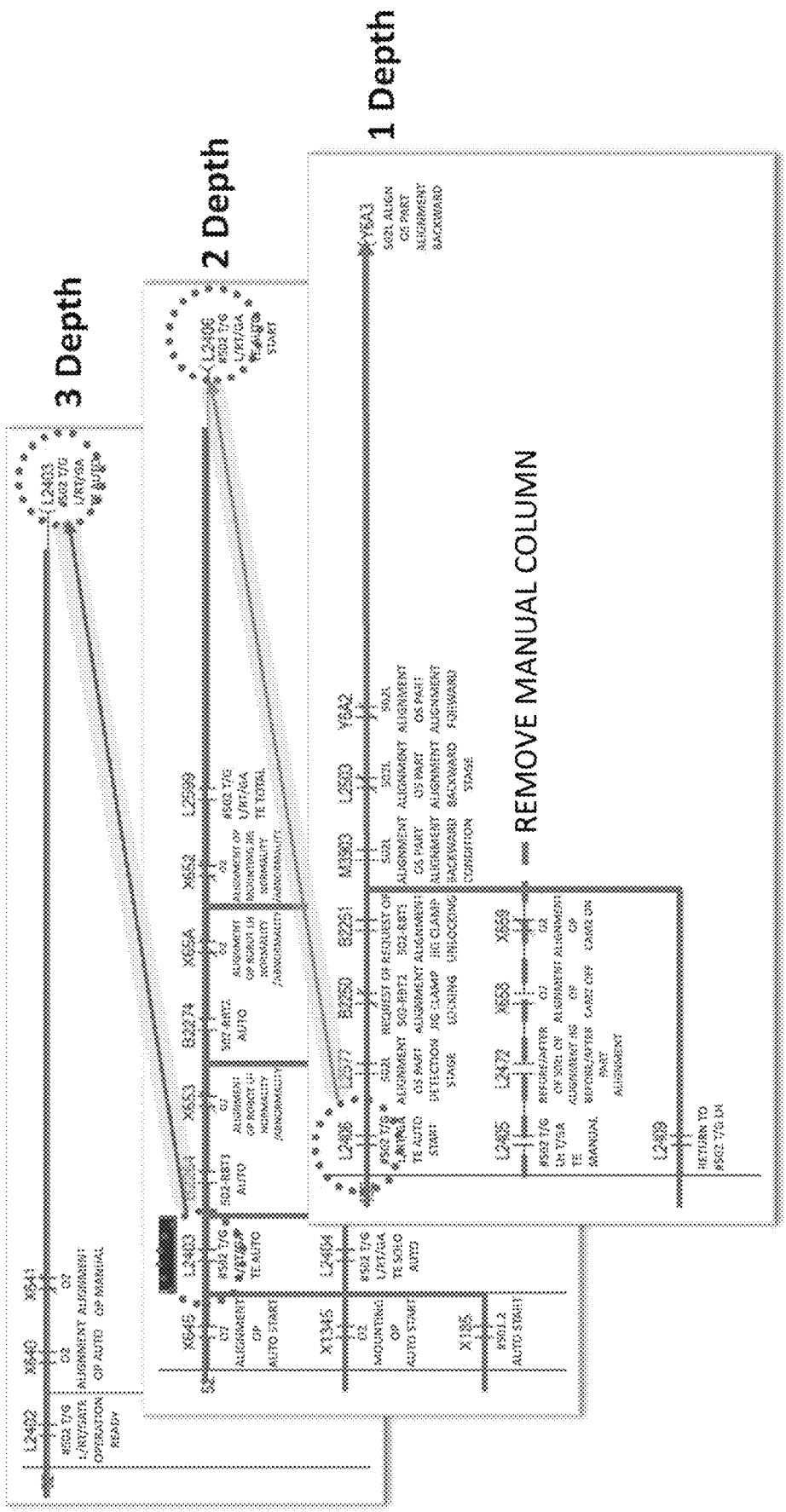
FIG. 6 is a reference diagram for expanding a path.

FIG. 6 is a reference diagram for expanding a path.

Referring to FIG. 6, it can be seen that a path is expanded when the contact A in the step is used as an output contact of another step.

Meanwhile, in the operation of generating the relationship between the contacts, a 1:1 relationship may be generated between the contacts, and the relationship may be expanded to a relationship between other contacts by using the generated relationship.

Figure 7:
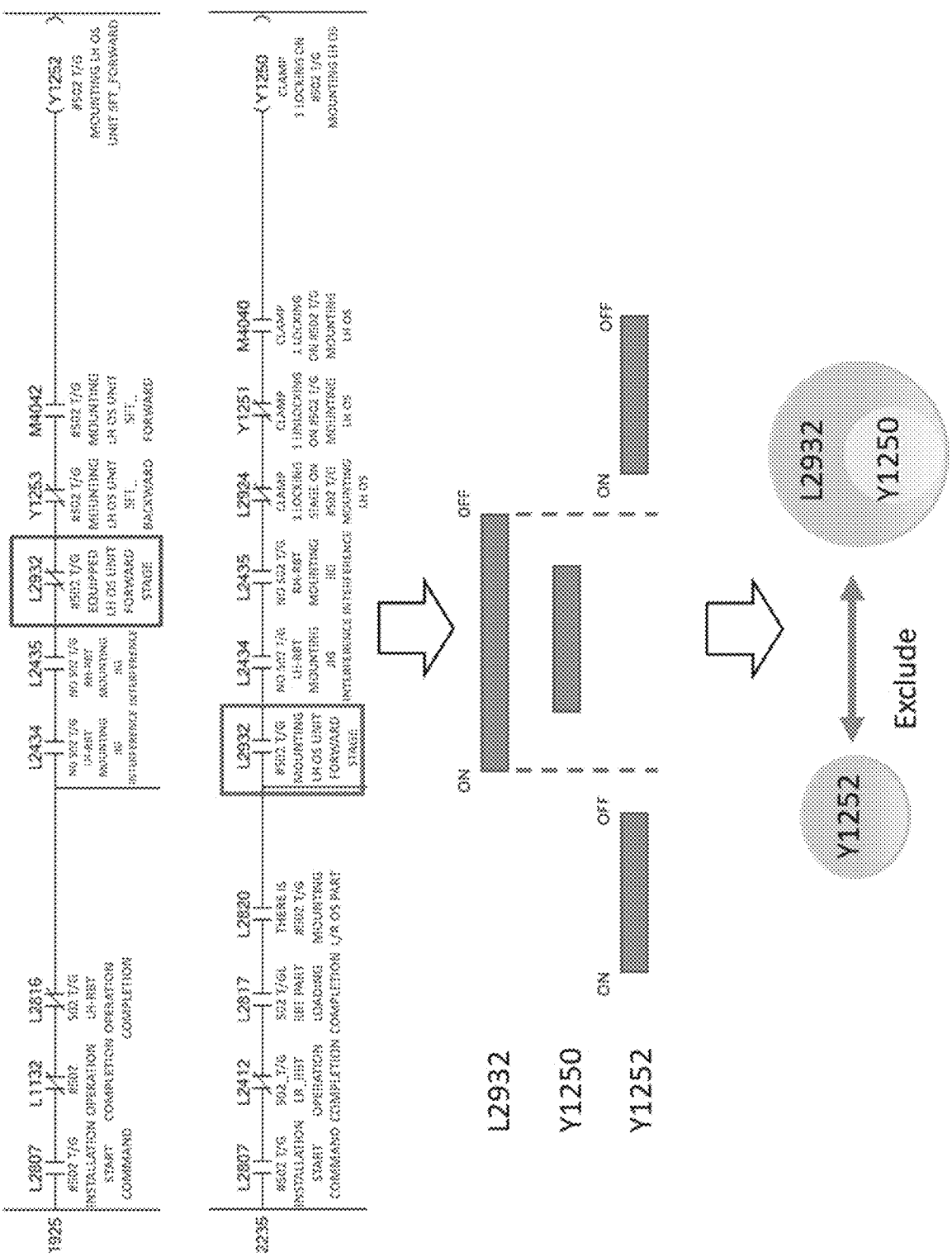
FIG. 7 is a reference diagram for expanding a relationship between contacts.

FIG. 7 is a reference diagram for expanding the relationship between the contacts.

Referring to FIG. 7, when two different contacts (e.g., Y1250 and Y1252) have the same contact (e.g., L2932) as "Include" and "Exclude," respectively, the relationship between the two different contacts may be generated as "Exclude."

Referring back to FIG. 3, after operation S10, operation S20 is an operation of generating a link and may include generating bars for each cycle from log data and links for each cycle.

Figure 8:
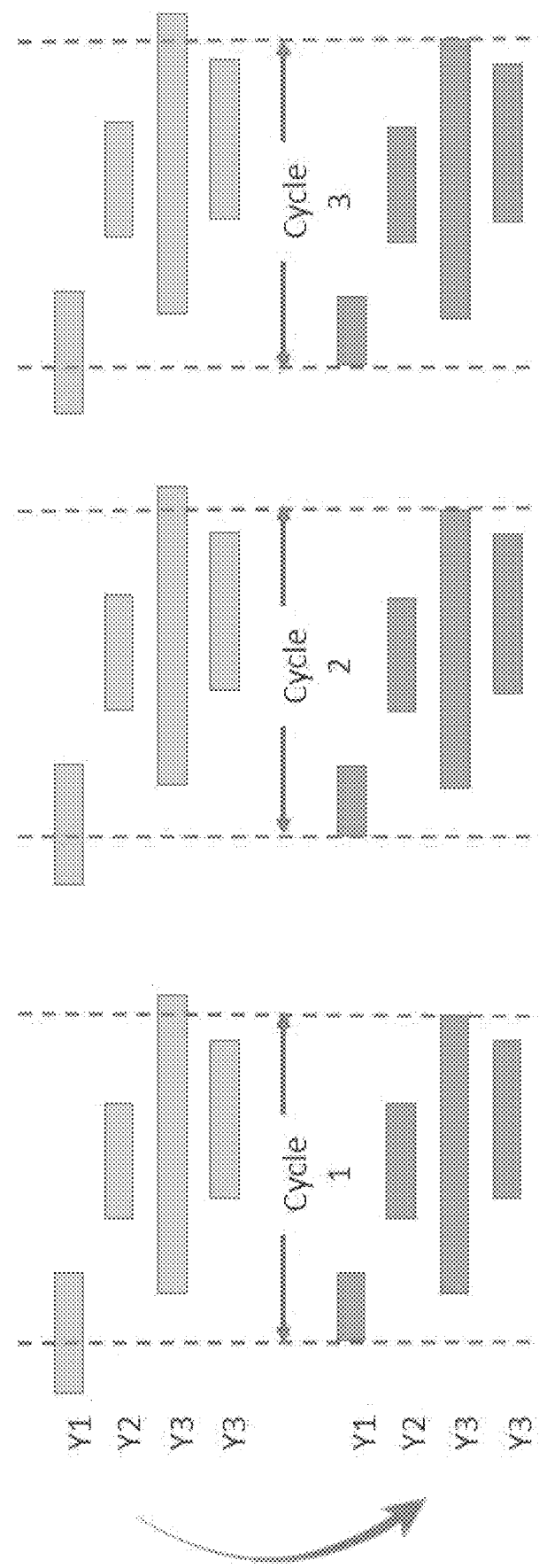
FIG. 8 is a reference diagram for generating a cycle bar from log data.

FIG. 8 is a reference diagram for generating a cycle bar from the log data.

Figure 9:
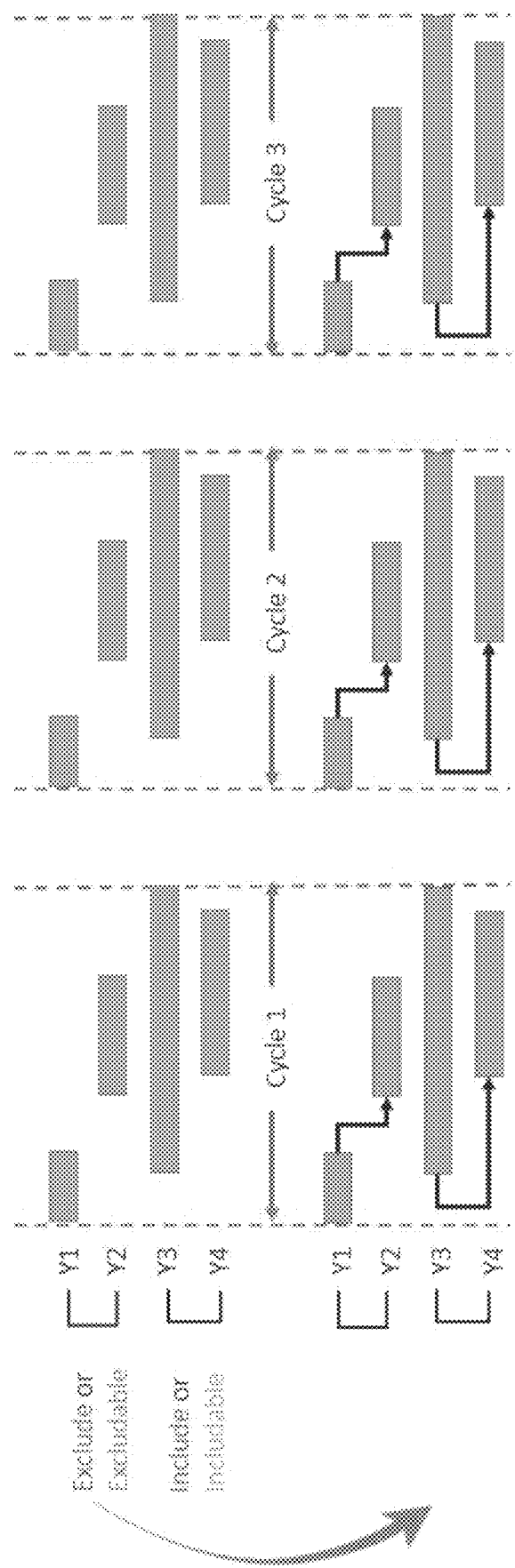
FIG. 9 is a reference diagram for generating links for each cycle.

FIG. 9 is a reference diagram for generating links for each cycle.

Referring to FIG. 9, when a relationship between two contacts is "Include" or "Includable," a link connecting starting points of each bar corresponding to the two contacts may be generated. The link connecting the starting points of each bar may mean that a signal of a From bar turns on and a signal of a To bar turns on after a specific time elapses. On the other hand, when the relationship between the two contacts is "Exclude" or "Excludable," a link connecting the end point of the From bar and the start point of the To bar may be generated. A link connecting the end point of the From bar and the start point of the To bar may mean that the signal of the From bar becomes OFF and the signal of the To bar becomes ON after a specific time elapses.

On the other hand, the master pattern generation method according to the present disclosure may include removing unnecessary bars and/or links in the operation of generating the link.

Figure 10:
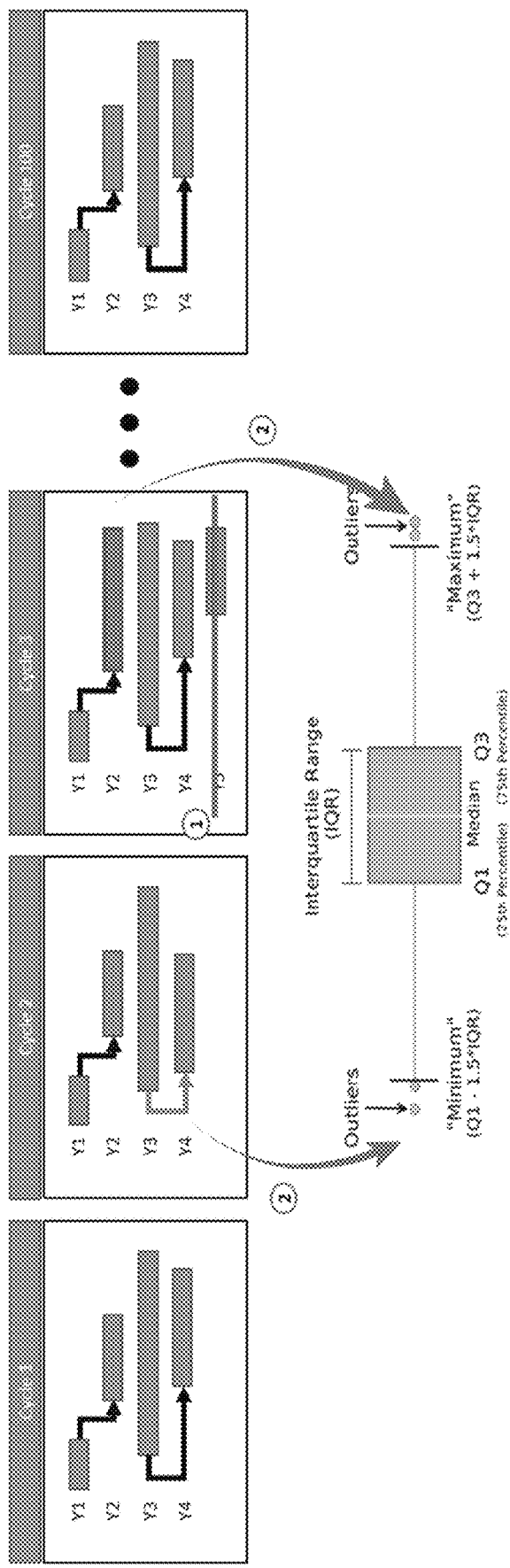
FIG. 10 is a reference diagram for removing unnecessary bars or links.

FIG. 10 is a reference diagram for removing unnecessary bars or links.

Referring to FIG. 10, in the step of generating the link, a bar or a link in which a frequency of occurrence within each cycle is less than a preset minimum occurrence rate may be removed (case Q) in FIG. 10). The preset minimum occurrence rate may be variously set. In addition, in the operation of generating the link, a link whose duration is outside of a preset duration range may be removed (case ( ) in FIG. 10). The preset duration may also be set in various ways. As an example, the average duration for the same contact included in all cycles may be calculated, and the range from the lower 25% to the upper 75% may be set as the normal duration range based on the average duration. In addition, a link having duration outside of 1.5 times the normal duration range in the average duration value may be removed.

Referring back to FIG. 3, after operation S20, operation S30 is an operation of calculating a statistic, and a statistic of bars and a statistic of links included in a plurality of cycles may be calculated. The statistic of the bars may be an average start time, an average duration, a standard deviation of a duration, or the like. The statistic of the links may be an average start time, an average duration, a standard deviation of duration, or the like. In addition to the examples of the above statistics, statistical techniques that may be easily applied by those skilled in the art may be used without limitation. In addition, after operation S30, operation S40 is the operation of generating a master pattern, and the master pattern may be generated according to the calculated statistics.

Meanwhile, the master pattern generation method according to the present disclosure may include generating a master pattern for each condition. The condition may be a value that may be set by a user.

Figure 11:
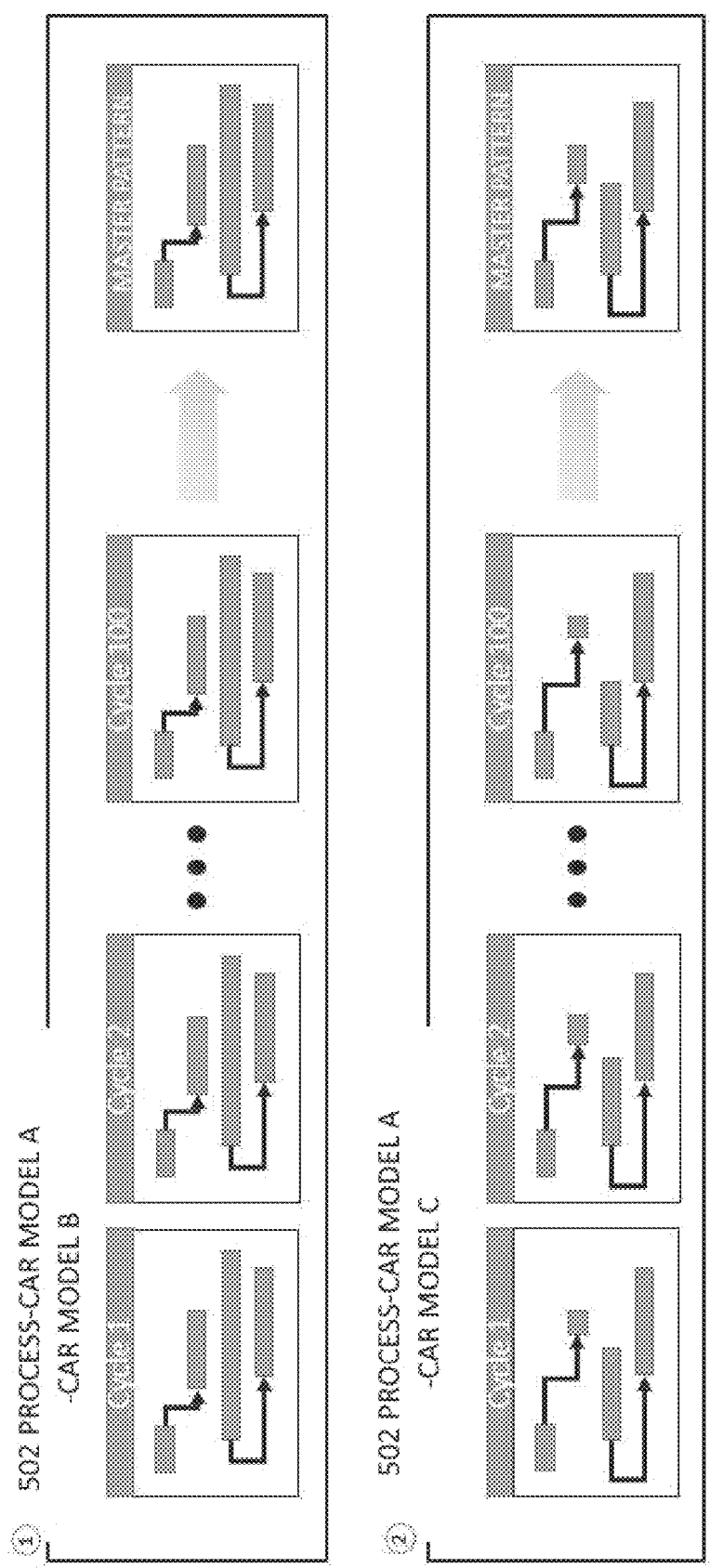
FIG. 11 is a reference diagram for generating a master pattern for each condition.

FIG. 11 is a reference diagram for generating a master pattern for each condition.

Referring to FIG. 11, for example, any process 502 may be a master pattern for a cycle that generates car model A and generates car model B in the previous cycle, and any process 502 may be a master pattern for a cycle that generates car model A and generates car model C in the previous cycle.

The master pattern generation method according to the present disclosure is a tree structuring operation (step S40 in FIG. 3) of extracting and treeizing common elements of the master pattern for each condition after the operation of generating a master pattern.

Figure 12:
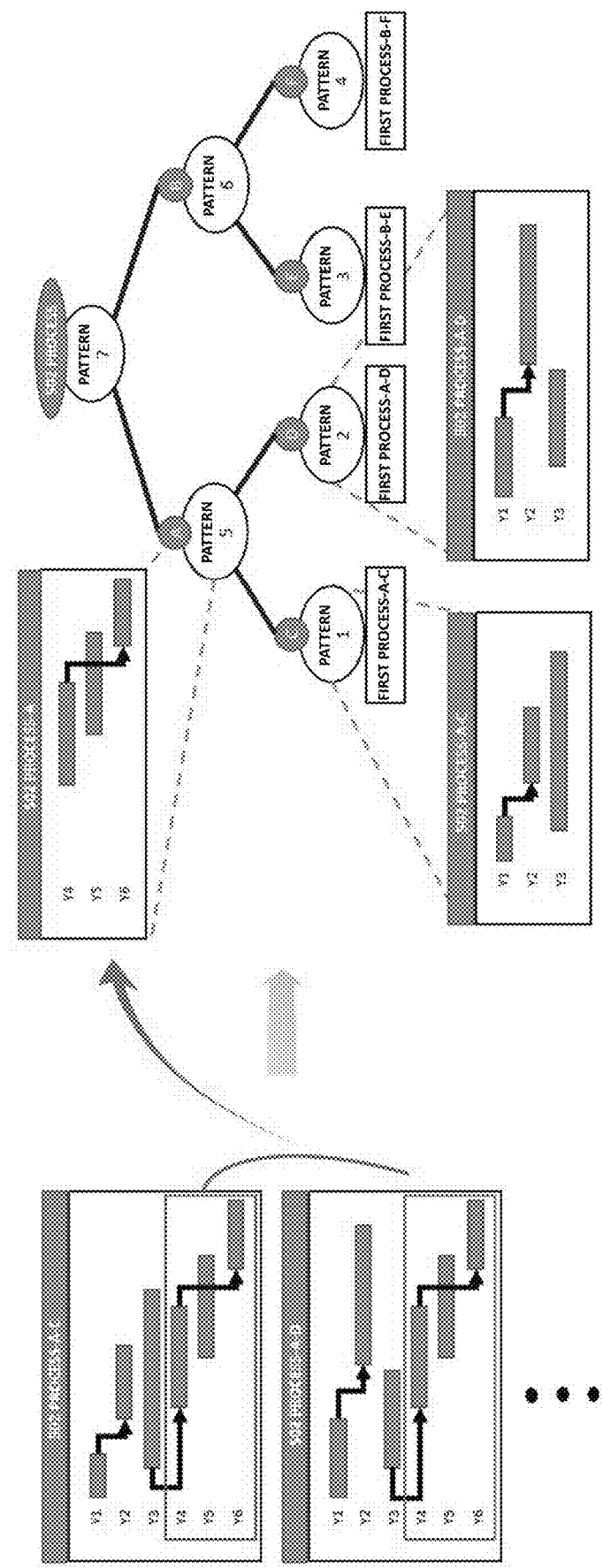
FIG. 12 is a reference diagram for treeizing the master pattern for each condition.

FIG. 12 is a reference diagram for treeizing of a master pattern for each condition.

On the other hand, the master pattern generated according to the master pattern generation method according to the present disclosure may be directly edited by a user. Examples of the editing include modifying a contact order of a master pattern, adding a new contact to a master pattern, removing a contact registered in a master pattern, updating a statistic of bars, moving a start time of a bar, generating a bar, removing a bar, modifying a bar tolerance, updating a statistic of links, generating a link, removing a link, modifying a link tolerance, etc.

Hereinafter, a training method for a cycle analysis model using a master pattern generated according to the master pattern generation method according to the present disclosure will be described. The training method for a cycle analysis model according to the present disclosure is a training method for a cycle analysis model of a PLC using a master pattern, and each operation may be performed by a processor.

The training method for a cycle analysis model according to the present disclosure is a method for generating a model that may determine an error that may occur in a cycle. The model is a model that is composed of an artificial neural network and may determine whether an error occurs by analyzing a cycle. An artificial neural network and an algorithm for training the same are technologies known to those skilled in the art, so detailed description thereof will be omitted.

Figure 13:
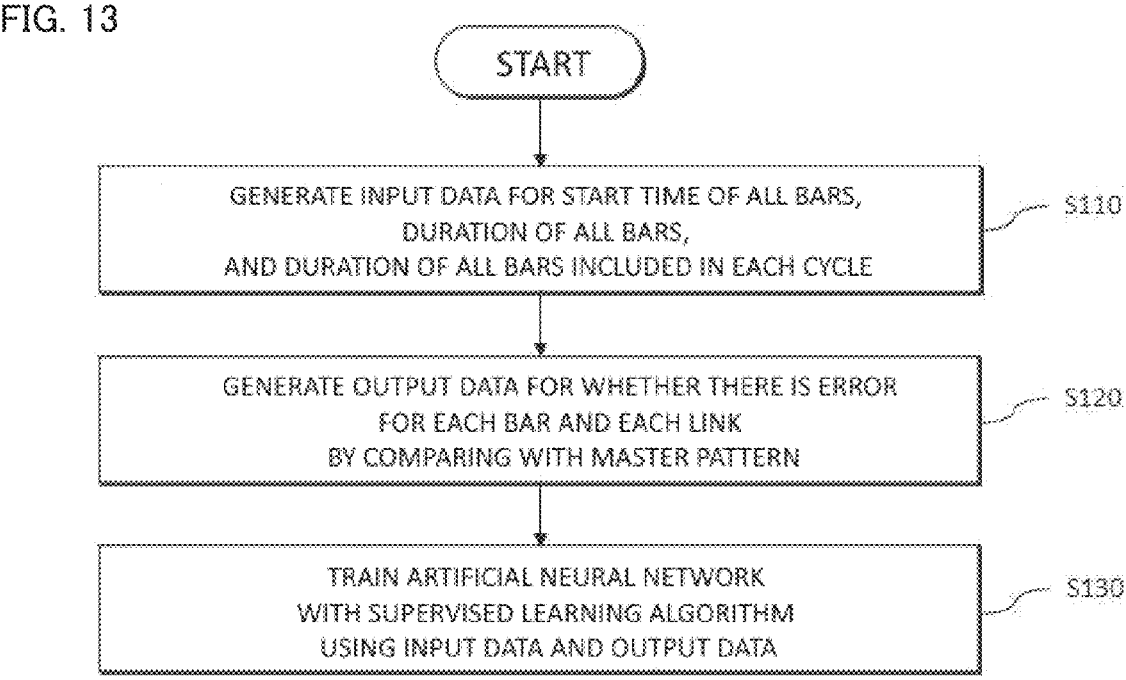
FIG. 13 is a schematic flowchart of a training method for a cycle analysis model according to the present disclosure.

FIG. 13 is a schematic flowchart of a training method for a cycle analysis model according to the present disclosure.

Referring to FIG. 13, first, in step S110, input data for a start time of all bars, a duration of all bars, and a duration of all bars included in each cycle may be generated using log data of the PLC. According to an embodiment of the present disclosure, a start time of each bar in the input data may be a positive value for a relative time interval between the start time of each cycle and the start time of each bar. According to an embodiment of the present disclosure, the start time for the bar that does not occur in the input data may be a negative value.

Figure 14:
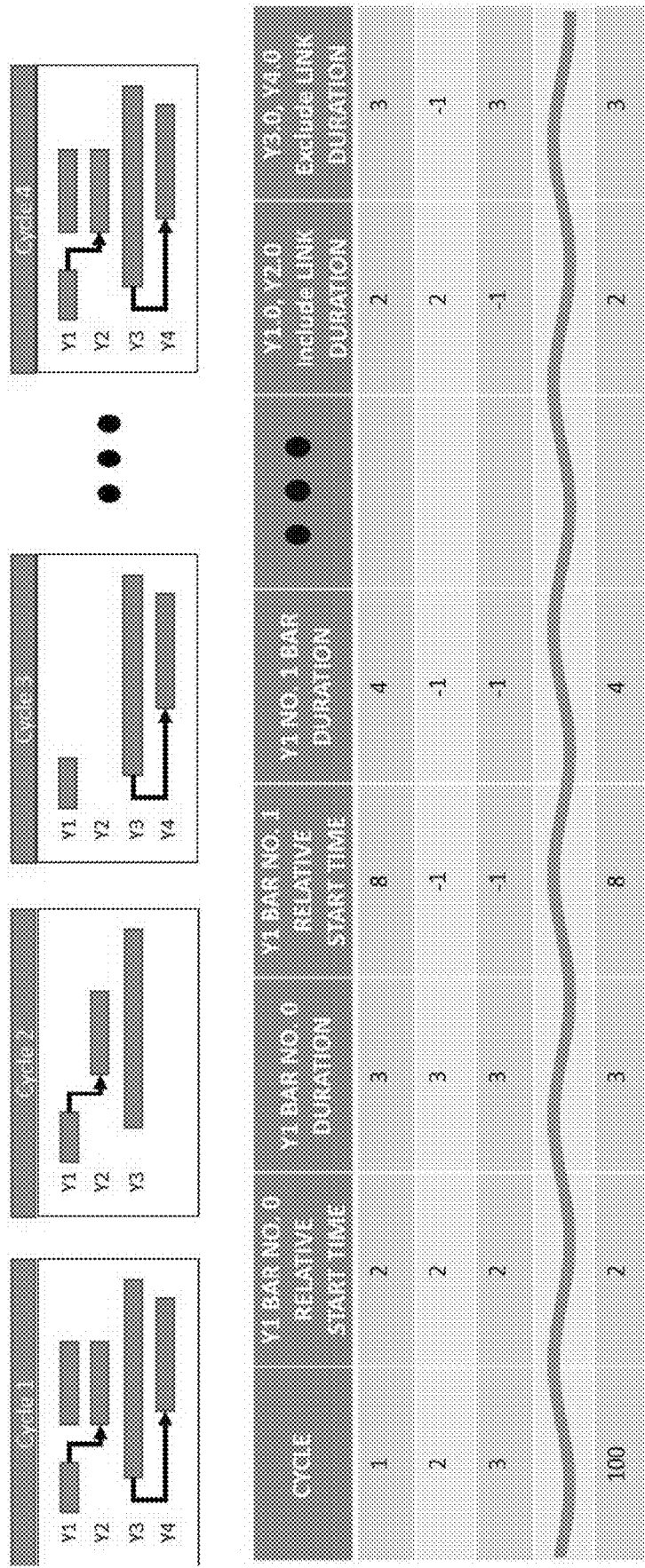
FIG. 14 is a reference diagram for input data.

FIG. 14 is a reference diagram for the input data.

Referring back to FIG. 13, in the next operation S120, the input data is compared with the master pattern generated according to the master pattern generation method according to the present disclosure, and output data for whether there is an error for each bar and link may be generated. According to an embodiment of the present disclosure, the output data has a first value (e.g., "0") when the contact or link of each cycle is normal compared to the master pattern, and has a second value (e.g., "1") when the contact or link of each cycle is abnormal.

Figure 15:
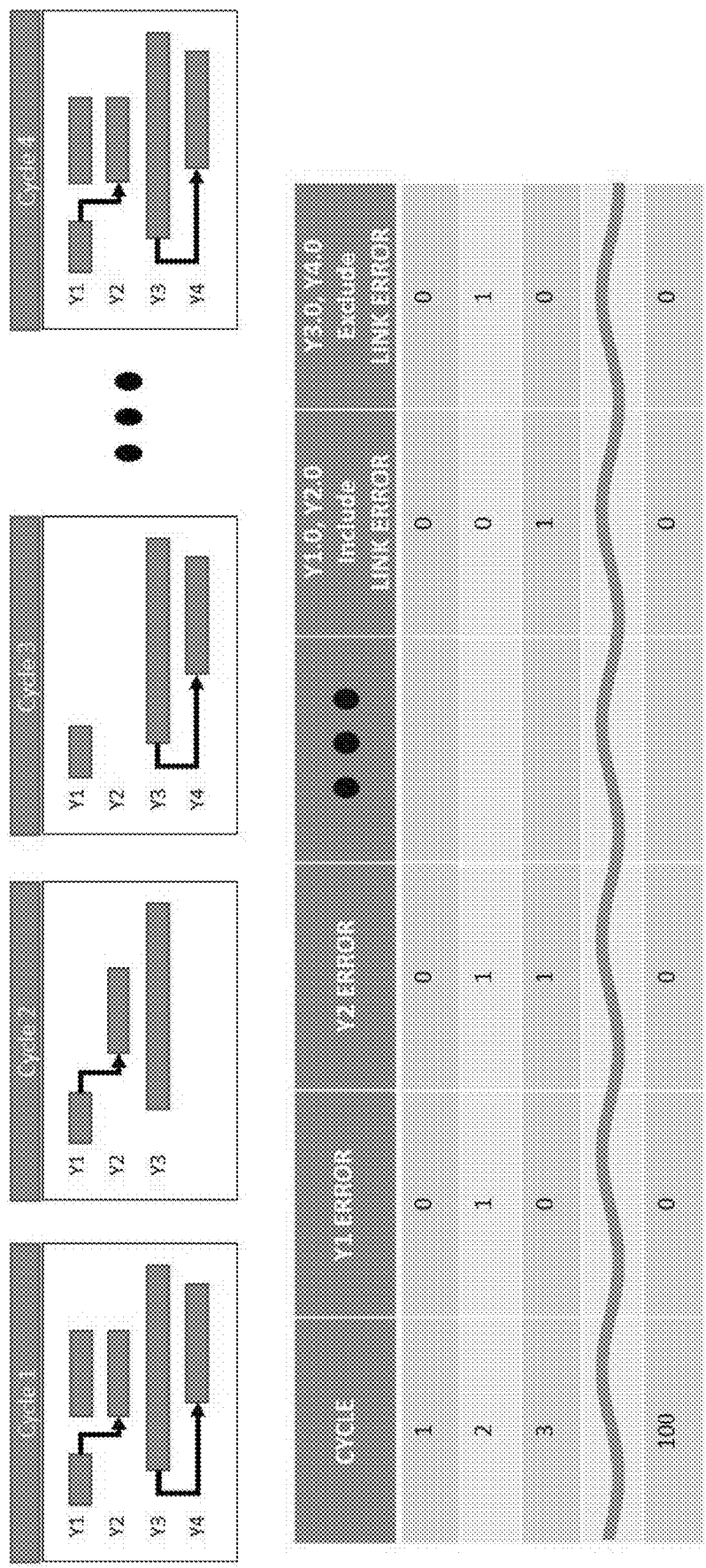
FIG. 15 is a reference diagram for output data.

FIG. 15 is a reference diagram for the output data.

Meanwhile, types of errors that may occur in a cycle include a contact error, a bar error, and a link error. The contact error corresponds to a case where a signal of the contact registered in the master pattern does not occur in the cycle.

Figure 16:
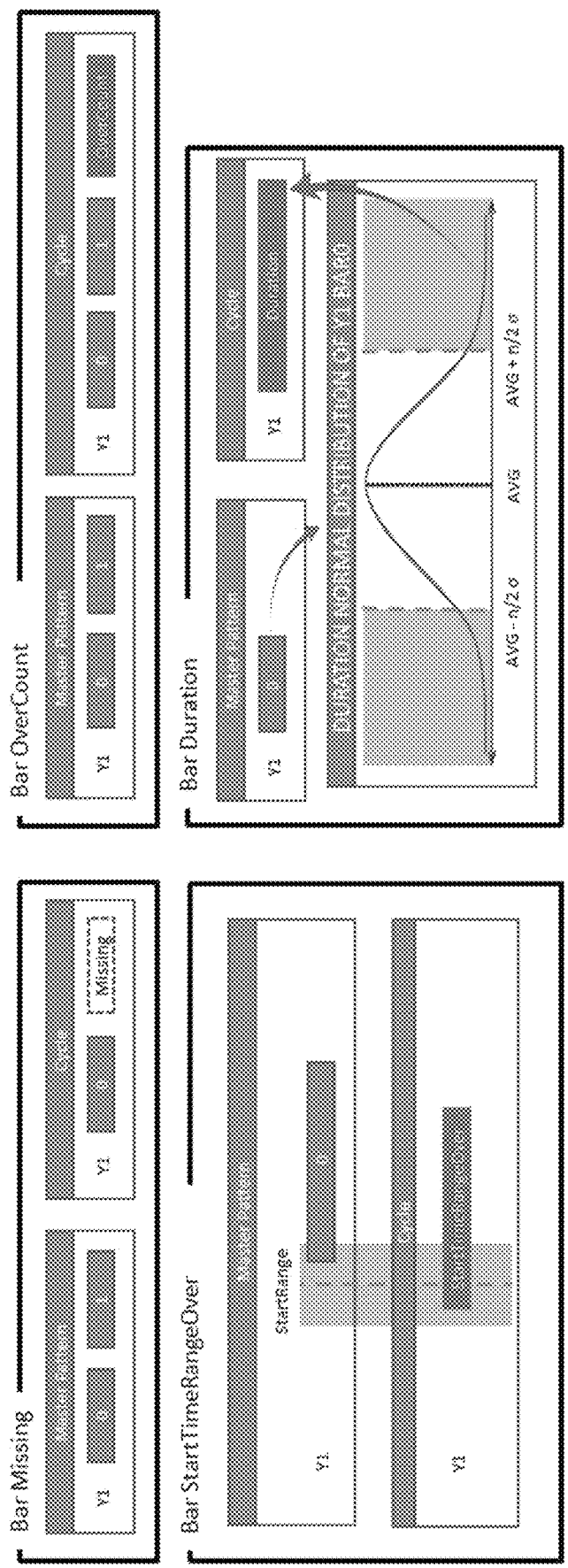
FIG. 16 is a reference diagram for a bar error.

FIG. 16 is a reference diagram for the bar error.

In the bar error, when a specific bar of the master pattern does not exist in a cycle (missing), when the number of bars of a specific contact is greater than the master pattern (OverCount), and when the start time of the bar starts earlier than the minimum start time (StartTimeRangeOver), there may be a case where the duration of the bar is outside of the allowable error (duration).

Figure 17:
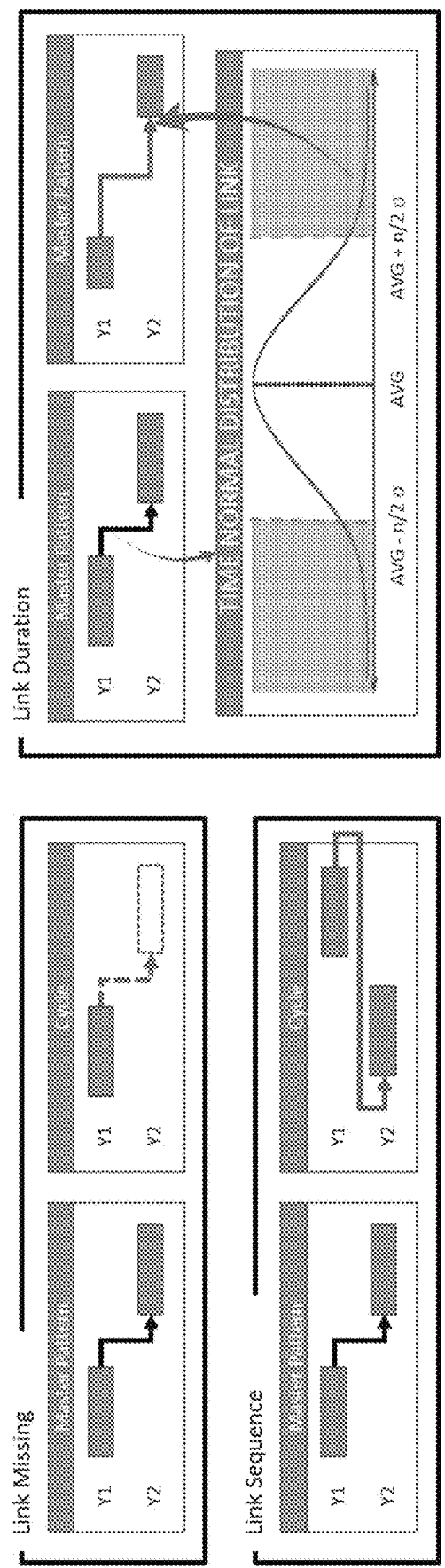
FIG. 17 is a reference diagram for a link error.

FIG. 17 is a reference diagram for the link error.

The link error may include a case where at least one of both bars of the link does not occur in a cycle (missing), a case in which the To bar occurs earlier than the From bar of the link (sequence), and a case in which the time of the link is outside of tolerance (Interval).

Referring back to FIG. 13, in the next operation S130, the artificial neural network may be trained with a supervised learning algorithm using the input data and the output data.

Figure 18:
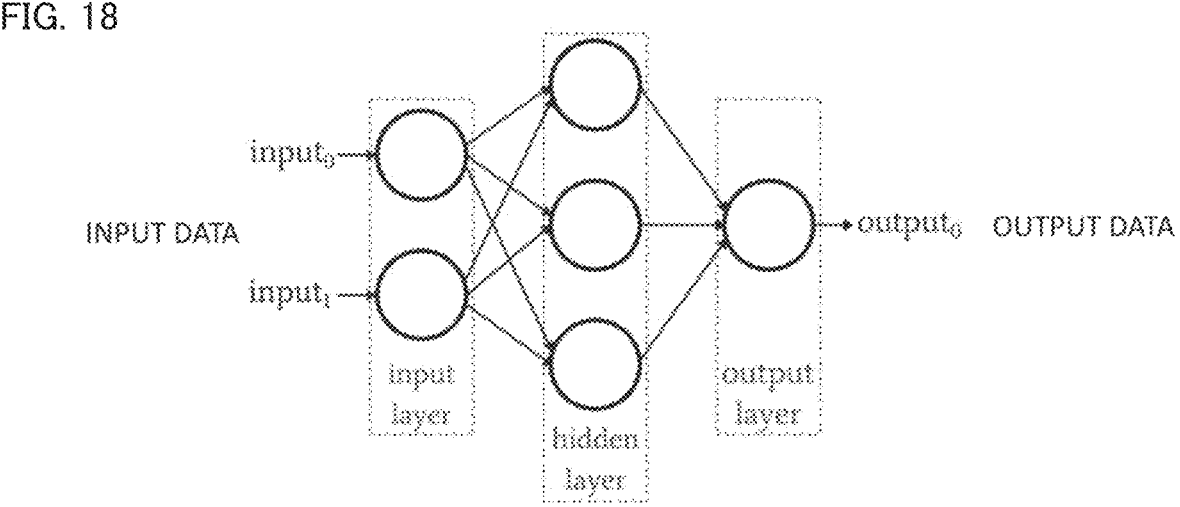
FIG. 18 is a reference diagram for training an artificial neural network with a supervised learning algorithm.

FIG. 18 is a reference diagram for training the artificial neural network with the supervised learning algorithm.

Referring to FIG. 18, it can be seen that the "input data" according to the present disclosure is located at an input end of the artificial neural network, and the "output data" according to the present disclosure is located at an output end of the artificial neural network. That is, the artificial neural network may be trained through a supervised learning algorithm in which an output value for an input value is predetermined.

When data of a new cycle is input, the artificial neural network trained according to the above description is capable of tracking not only whether there is an error in the cycle, but also at which contact and/or link an error occurs. The master pattern generation method and the training method for a cycle analysis model according to the present disclosure are different from the related art in that the methods are a technology of processing a machine control language (low-level language) that is difficult for humans to analyze and converting the machine control language into an analyzable language (high-level language), i.e., a machine language processing (MLP)-based technology that may analyze the executed machine language (a language that controls a machine) with a computer and may be understood by humans. Using the cycle analysis model according to the present disclosure, it is possible to provide various services such as control logic inspection, control logic generation, real-time abnormality detection, reproduction, and productivity and quality analysis by analyzing and graphing a correlation of static and dynamic data flow while a device to be analyzed is controlled and based on an AI model such as a graph neural network (GNN).

Meanwhile, the master pattern generation method and the training method for a cycle analysis model according to the present disclosure may include a processor, an application-specific integrated circuit (ASIC), other chipsets, a logic circuit, a register, a communication modem, a data processing device, etc., that are known in the art for executing the described calculations and various control logic. In addition, when the above-described control logic is implemented in software, the processor may be implemented as a set of program modules. In this case, the program module may be stored in the memory device and executed by the processor.

In order for the computer to read the program and execute the methods implemented as a program, the program may include code coded in a computer language such as C/C++, C#, JAVA, Python, machine language, and the like that the processor (CPU) of the computer can read through a device interface of the computer. Such code may include functional code related to functions defining functions necessary for executing the methods, or the like, and include an execution-procedure-related control code necessary for the processor of the computer to execute the functions according to a predetermined procedure. In addition, such code may further include a memory-reference-related code for which location (address, house number) of the internal or external memory of the computer additional information or media necessary for the processor of the computer to execute the functions should be referenced. In addition, when the processor of the computer needs to communicate with any other computers, servers, or the like located remotely in order to execute the above functions, the code may further include a communication-related code for how to communicate with any other computers, servers, or the like located remotely using a communication module of the computer, how to transmit/receive any information or media during communication, or the like.

The storage medium is not a medium that stores data therein for a while, such as a register, a cache, a memory, or the like, but is a medium that semi-permanently stores data therein and is readable by a device. Specifically, examples of the storage medium include, but are not limited to, a read-only memory (ROM), a random-access memory (RAM), a compact disc read-only memory (CD-ROM), a magnetic tape, a floppy disk, an optical data storage device, and the like. That is, the program may be stored in various recording media on various servers accessible by the computer or in various recording media on the computer of the user. In addition, the medium may be distributed in a computer system connected by a network, and store computer-readable codes in a distributed manner.

According to the present disclosure, it is possible to track not only whether a PLC cycle has an error, but also at which contact and/or which link the error occurs.

According to the present disclosure, it is possible to provide various services such as control logic inspection, control logic generation, real-time abnormality detection, reproduction, and productivity and quality analysis by analyzing and graphing a correlation of static and dynamic data flow while a device to be analyzed is controlled and based on an AI model such as a GNN.

The effects of the present disclosure are not limited to the above-described effects, and other effects that are not described may be obviously understood by those skilled in the art from the following description.

Although embodiments of the present disclosure have been described with reference to the accompanying drawings, those skilled in the art will appreciate that various modifications and alterations may be made without departing from the spirit or essential features of the present disclosure. Therefore, it is to be understood that exemplary embodiments described hereinabove are illustrative rather than being restrictive in all aspects.

What is claimed is:

1. A master pattern generation method from a ladder logic of a programmable logic controller (PLC), the method comprising:
    generating, by a processor, a master pattern to be compared with contacts in the ladder logic of the PLC to determine whether each cycle is normal or abnormal, wherein
    the generating the master pattern includes:
        generating a relationship between the contacts included in the ladder logic;
        generating bars for each cycle from log data of the PLC and links for each cycle;
        calculating a statistic of the bars and links included in a plurality of cycles; and
        generating h master pattern based on the calculated statistic,
    the determination of whether each cycle is normal or abnormal includes:
        comparing the master pattern with input data to generate output data indicating whether there are errors for each bar and link, and
        detecting, with an artificial neural network trained using the input data and the output data, at which contact and link the error occurs with respect to data of a new cycle, and correcting the error, and
    the generating of the relationship between the contacts includes:
        removing a manual column from the ladder logic and expanding a path by searching for a step in which contact A that maintains an OFF state as usual and then changes to an ON state is used as an output contact of another step.

2. The method of claim 1, wherein the relationship between the contacts is Include, Includable, Exclude, and Excludable.

3. The method of claim 2, wherein, in the generating of the relationship between the contacts, when two different contacts each have the same contact as Include and Exclude, the relationship between the two different contacts is generated as Exclude.

4. The method of claim 1, wherein
    the relationship between the contacts is Include, Includable, Exclude, and Excludable,
    in the generating of the link, when the relationship between the two contacts is Include or Includable, a link connecting starting points of each bar corresponding to the two contacts is generated, and
    when the relationship between the two contacts is Exclude or Excludable, a link connecting an ending point of a FROM bar and a starting point of a TO bar among the two contacts is generated.

5. The method of claim 1, wherein the generating of the link includes removing a bar or a link whose frequency of occurrence within each cycle is less than a preset minimum occurrence rate.

6. The method of claim 1, wherein the generating of the link includes removing a link whose duration is outside of a preset duration range.

7. The method of claim 1, wherein
    the statistic of the bars is an average start time of the bars, an average duration of the bars, and a standard deviation of durations of the bars, and
    the statistic of the links is an average duration of the links and a standard deviation of durations of the links.

8. The method of claim 1, wherein the calculating of the statistic includes calculating the statistic of the bars and the statistic of the links included in the plurality of cycles corresponding to conditions established by a user.

9. The method of claim 8, further comprising, after the generating of the master pattern, extracting and treeizing common elements of the master pattern for each condition.

10. A method of training a cycle analysis model of a programmable logic controller (PLC) to detect an error in the PLC, the method comprising:
generating, by a processor, a master pattern to be compared with contacts in a ladder logic of the PLC to determine whether each cycle is normal or abnormal, wherein the generating the master pattern includes:
generating a relationship between the contacts included in the ladder logic;
generating bars for each cycle from log data of the PLC and links for each cycle;
calculating a statistic of the bars and links included in a plurality of cycles; and
generating the master pattern based on the calculated statistic;
generating input data for start times of all the bars, durations of all the bars, and durations of all the bars included in each cycle by using h log data of h PLC;
comparing the input data with the master pattern to generate output data indicating whether there are errors for each bar and link;
training an artificial neural network with a supervised learning algorithm using the input data and the output data;
inputting data of a new cycle into the trained artificial neural network and detecting at which contact and link the error occurs; and
correcting the error in the PLC based on a detecting result.

11. The method of claim 10, wherein the start time of each bar in the input data is a positive value for a relative time interval between a start time of each cycle and the start time of each bar.

12. The method of claim 11, wherein a start time for a bar that does not occur in the input data is a negative value.

13. The method of claim 10, wherein the output data has a first value when a contact or a link of each cycle is normal compared to the master pattern, and has a second value when the contact or link of each cycle is abnormal compared to the master pattern.

* * * * *